United States Patent [19]

Siddall

[11] 3,832,385

[45] Aug. 27, 1974

[54] SUBSTITUTED 4-ALKYLTHIOBENZOIC ACID ESTERS

[75] Inventor: John B. Siddall, Palo Alto, Calif.

[73] Assignee: Zoecon Corporation, Palo Alto, Calif.

[22] Filed: May 5, 1972

[21] Appl. No.: 269,692

Related U.S. Application Data

[62] Division of Ser. No. 60,636, Aug. 3, 1970, abandoned.

[52] U.S. Cl......... 260/470, 260/340.9, 260/410.9 R, 260/413, 260/471 R, 260/473 R, 260/516, 260/518 R, 260/519, 260/520, 260/521 R, 260/526 N, 260/539 R, 260/539 H, 260/544 M, 260/570.5 P, 260/570.7

[51] Int. Cl........................................... C07c 149/40

[58] Field of Search............................ 260/470, 516

[56] References Cited
UNITED STATES PATENTS

| | | | |
|---|---|---|---|
| 3,105,090 | 9/1963 | Leonard............................. | 260/470 |
| 3,709,915 | 1/1973 | Siddall.............................. | 260/470 |
| 3,712,913 | 1/1973 | Chodnekar et al................ | 260/470 |
| 3,718,686 | 2/1973 | Chodnekar et al................ | 260/470 |
| 3,729,508 | 4/1973 | Ziegler et al...................... | 260/516 |

OTHER PUBLICATIONS

Thomae C. A. 60 2865g (1964)

Soum et al. I C. A. 72 100310f (1970)

Soum et al. II C. A. 72 12398k (1970)

Upjohn Co. C. A. 56 8646g (1962)

*Primary Examiner*—Lorraine A. Weinberger
*Assistant Examiner*—John F. Terapane
*Attorney, Agent, or Firm*—Lee-Louise H. Priest; Donald W. Erickson

[57] ABSTRACT

Novel phenyl compounds of formulas I, II, III and IV and intermediates useful for control of insects.

4 Claims, No Drawings

SUBSTITUTED 4-ALKYLTHIOBENZOIC ACID ESTERS

This is a division of application Ser. No. 60,636, filed Aug. 3, 1970, now abandoned.

This invention relates to novel phenyl compounds, syntheses thereof and methods and compositions for the control of insects.

The phenyl compounds of the present invention are those of the formulas I, II, III and IV:

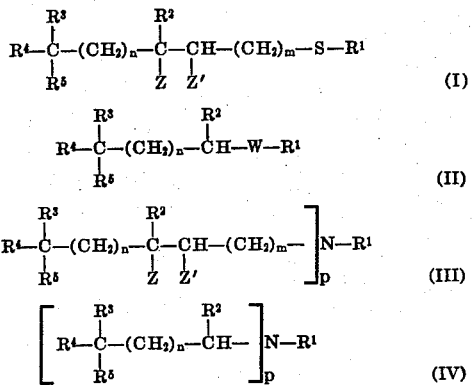

wherein,
$R^1$ is the group

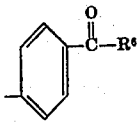

each of $R^2$, $R^3$ and $R^4$ is lower alkyl;
$R^5$ is -OR or -NR'R'' in which R is hydrogen, lower alkyl or aralkyl and each of R' and R'' is hydrogen or lower alkyl;
$R^6$ is lower alkyl, cycloalkyl, or aralkyl or -$OR^7$ in which $R^7$ is hydrogen, lower alkyl, cycloalkyl or aralkyl;

W is oxygen, sulfur, sulfinyl or sulfonyl;
each of Z and Z' is hydrogen or taken together a carbon-carbon double bond;
m is one or two;
n is three or four; and
p is one or two.

The term "lower alkyl," as used herein, refers to primary or secondary alkyl having a chain length of one to six carbon atoms, straight or branched chain, such as methyl, ethyl, n-propyl, i-propyl, n-butyl, i-butyl, s-butyl, n-pentyl, i-hexyl and n-hexyl. The term "aralkyl," as used herein, refers to aralkyl of seven to 12 carbon atoms, such as benzyl, phenethyl, methylbenzyl and naphthylmethyl. The term "cycloalkyl," as used herein, refers to cycloalkyl group of four to eight carbon atoms.

The compounds of formulas I, II, III and IV are useful for the control of insects. They are applied using liquid or solid carriers and, preferably, at a time so as to contact the immature insect during embryo, larvae or pupa stage of the insect's life. The control of insects can be brought about by such treatment as contact of the insect with the compound by direct topical contact, vapor contact, contact through ingestion or transmittal from one insect to another through physical contact.

For example, topical application, as by spraying, of a compound of the present invention to an insect during the egg, larvae or pupa stage effectively inhibits the normal passage of the immature insect to the next metamorphic stage. In some cases, complete inhibition is obtained and in other cases partial inhibition occurs resulting in an imperfect insect which is unable to reproduce. The compounds can be used at very low dosage levels of the order of 0.001 µg. to 10 µg. per insect. In the application of the compounds, the application can be such as to apply lower or higher dosages of the aforementioned range based on such factors as the estimated insect population, environmental conditions, locus of the insects and previous trials. Carriers, such as water, mineral and vegetable oils, e.g., refined kerosene, xylene, toluene, cottonseed oil, sesamol, and the like, and solid carriers, such as silica, talc, resins, synthetic polymers, can be used to dilute the active ingredient. Insect attractants or pheromones can also be included. Emulsifying agents and wetting agents can be used in formulations of the compounds to assist in application. Generally, the formulation will contain less than 95 percent by weight of the active compound and more frequently less than 25 percent.

Typical insects which can be controlled by treatment with the compounds of the present invention are bugs of the family Miridae, such as Lygus bugs; Diptera, such as Aedes aegypti; Aphididae, such as melon aphid and cabbage aphid; Periplaneta americana, Galleria mellonella, Tenebrio molitor, Tribolium confusum, Oncopeltus fasciatus, Phthorimoea operculella (potato tubermoth), Dysdercus, Hypera postica, Manduca sexta and Heliothis zea.

Depending upon the particular insect being treated and the particular stage of the life cycle at the time of treatment, control of insects by treatment with a compound of the present invention is attributed to the compound's activity to: inhibit metamorphosis; act as a direct insecticide, particularly at the embryo stage; act as a chemosterilant; or break the diapause of the insect.

Although not intending to be limited by a theoretical explanation, it appears that the effectiveness of the compounds of the present invention can be traced to their ability to mimic the activity of juvenile hormone substances. Juvenile hormone has been identified as methyl 10,11-(cis)oxido-7-ethyl-3,11-dimethyltrideca-2(trans),6(trans)-dienoate (Roeller, et al., Angew. Chem. internat. Edit. 6, 179 (1967) and methyl 10,11-(cis)oxido-3,7,11-trimethyltrideca-2(trans),6(trans)-dienoate (Meyer, et al., Proc. N.A.S. (US) 60, 853 (1968). Juvenile hormone analogs have been described in Life Sciences 4, 2323 (1965); Romanuk et al., Proc. N.A.S. (US) 57, 349 (1967); Science 164, 323 (1969); U.S. Pat. Nos. 3,429,970 and 3,453,362; Canadian Pat. No. 834,191 and Wakabayashi, J. Med. Chem. 12, 191 (1969).

In the application of the compounds of the present invention involving isomerism, there is usually employed a mixture of isomers. As individual isomers, the trans isomer (i.e., when Z and Z' form a double bond) is preferably employed for the control of insects. The compounds of the present invention can be conveniently prepared from the corresponding olefin using mercuric salt followed by reduction of the oxymercurial intermediate in situ. Thus, an olefin of the formula (n' is two or three):

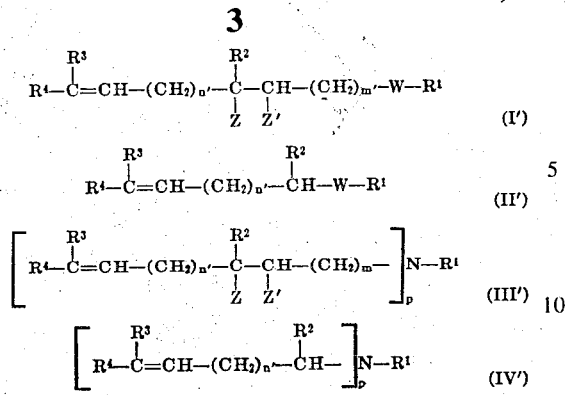

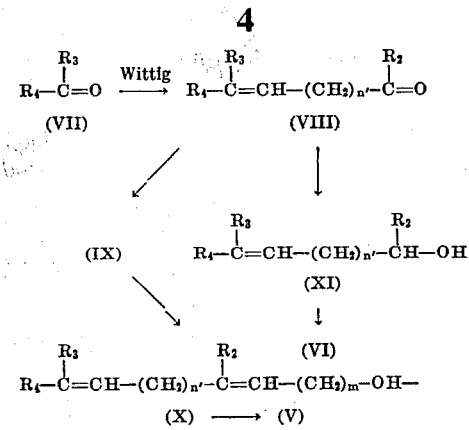

is reacted with, for example, mercuric acetate in aqueous ether followed by reduction to yield the corresponding compound of formula I, II, III or IV in which R is -OH. By conducting the reaction in the presence of the appropriate alcohol or amine, the corresponding ether or amine is obtained. Suitable mercuric salts include mercuric acetate, mercuric nitrate, mercuric trifluoroacetate, mercuric acylates and mercuric halides. Suitable reducing agents include the borohydrides, hydrazine and sodium amalgam. See Brown and Rei, J. Am. Chem. Soc. 91, 5646 (1969); Brown and Kurek, J. Am. Chem. Soc. 91, 5647 (1969); Lattes and Perie, Tetrahedron Letters, No. 51, 5165 (1967); J. Amer. Chem. Soc. 89, 1522 and 1524 (1967); Perie and Lattes, Bulletin De La Societe Chimique De France, No. 2, 583 (1970) and Lattes and Perie, C.R. Acad. Sci. Paris 262, 1591 (1966) in which there is described suitable methods for conversion of the olefins I′, II′, III′ and IV′ into the compounds of the present invention.

In the case of compounds wherein $R^6$ is alkyl, cycloalkyl, or alkyl, i.e. the ketones — the reduction of the carbonyl group may occur. Thus, the ketones are prepared by reaction of the acid ($R^6$ is $-OR^7$ in which $R^7$ is hydrogen) with the appropriate organo lithium compound after the foregoing reaction is completed.

The starting compounds I′ and II′, in which W is oxygen, can be prepared by the reaction of alkyl 4-hydroxybenzoate with a bromide or chloride of the formula V or VI (X is bromo or chloro):

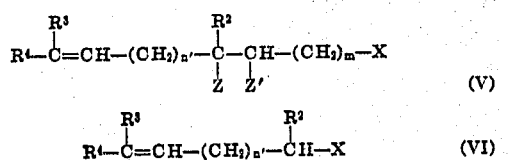

The bromide and chloride of formula V can be prepared from the corresponding C-1 alcohol which is obtained by reduction of an acid or ester of the formula IX

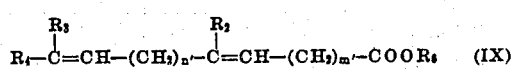

in which $R^6$ is hydrogen or lower alkyl and m′ is zero or one, using lithium aluminum hydride, or the like. The overall synthesis can be outlined as follows:

In the practice of the above process, a dialkyl ketone of formula VII is reacted with a Wittig reagent of formula VII′ ($\phi$ is phenyl)

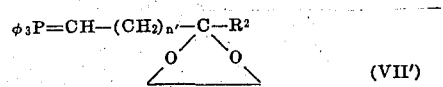

to form the ethylene ketal of a compound of formula VIII which is hydrolyzed by treatment with acid to the ketone (VIII). The ketone (VIII) is then reacted with the carbanion of dialkyl carbalkoxyphosphonate to yield the $\alpha,\beta$-unsaturated ester (IX) (m′ is zero and $R^6$ is lower alkyl) or with $\beta$-carboxyethyltriphenylphosphonium chloride in the presence of base to yield the $\beta,\gamma$-unsaturated acid (IX; m′ is one and $R^6$ is hydrogen). Suitable conditions are described in my application Ser. No. 7,987, filed Feb. 2, 1970, now U.S. Pat. No. 3,697,565, and by H. S. Corey, et al., J. Am. Chem. Soc. 86, 1884–1885 (1964), the disclosures of which are incorporated by reference. The acid or ester (IX) is then reduced by conventional techniques using lithium aluminum hydride or like reducing agent to yield the primary alcohol (X) which is converted to the C-1 bromide or chloride (V) using phosphorus trichloride, phosphorus tribromide, phosphorus pentachloride, phosphorus pentabromide, or the like. Compounds of formula V can be prepared also using the synthesis of Bowers, Science 164, 323– 325 (1969) which is incorporated by reference. The compounds of formula XI are prepared by reduction of the ketone (VIII) using sodium borohydride, lithium aluminum hydride, or the like, and the conversion of the secondary alcohol (XI) into the bromide or chloride (VI) using phosphorus tribromide or phosphorus trichloride.

The thio compounds of formulas I′ and II′ (W is sulfur) can be prepared by treating a bromide or chloride of formula V or VI with the appropriate mercaptan in the presence of sodium hydroxide, sodium alkoxide, and the like. Alternatively, the halide V or VI is converted to the corresponding thiol by treatment with hydrogen sulfide in alcohol in the presence of base, such as sodium hydroxide. The thus-obtained aliphatic thiol on treatment with sodium hydroxide, potassium hydroxide, or the like, furnishes the corresponding alkali mercaptide with on treatment with the bromide or chloride of the formula X-$R^1$ furnishes the thioethers or sulfides of formulas I′ and II′ (W is sulfur).

The sulfinyl compounds are prepared by treatment of a thioether with sodium metaperiodate, hydrogen peroxide, or the like, at a temperature of from about 0° to 20°C for about 1 to 6 hours. The reaction usually affords some of the sulfonyl compound also which can be separated by chromatography. By using more than one mole of sodium periodate or hydrogen peroxide, higher temperature and longer reaction time, the reaction flows formation of the sulfonyl compounds. Preparation of sulfinyl and sulfonyl compounds is described by N. J. Leonard, et al., Journal of Organic Chemistry 27, 282 (1962).

The amines of formulas III' and IV' are prepared by the reaction of a halide of formula V or VI with alkyl 4-aminobenzoate. The reaction usually affords a mixture of secondary and tertiary amines, the tertiary amine being favored by using an excess of the halide V or VI.

An alternative process for the preparation of compounds of the formulas I, II, III or IV is to perform the addition of water, alcohol or amine, using the mercuric salt process described above, on a compound of formula V, VI or IX and thereafter perform the alkylation step.

The following examples are provided to illustrate the practice of the present invention and the preparation of the novel compounds. Temperatures in degrees Centigrade.

EXAMPLE 1

A. 3,7-Diethylnona-2,6-dien-1-ol (4.8 g.) is dissolved in 40 ml. of ether, cooled to −50° and 2.44 g. of phosphorus tribromide in 5 ml. of ether is added over 20 minutes. The reaction mixture is stirred for 2 hours, poured onto ice and extracted with ether. The ethereal extracts are combined, washed with 10 percent sodium carbonate, water and saturated sodium chloride, dried over sodium sulfate and the solvent concentrated to yield 1-bromo-3,7-diethylnona-2,6-diene.

B. Three grams of methyl p-hydroxybenzoate and 4 g. of 1-bromo-3,7-diethylnona-2,6-diene are added at about 20° to methanolic sodium methoxide (0.5 g. of sodium and 7 ml. of methanol) and the mixture refluxed for 5 hours. After cooling, to about 20°, the sodium bromide is filtered off and the filtrate concentrated. The concentrate is diluted with water and then extracted with ether. The ethereal extracts are combined, dried over sodium sulfate and evaporated under reduced pressure to yield methyl 4-(3', 7'-diethylnona-2,6-dienyloxy)benzoate which can be purified by chromatography.

C. The procedure of Part A is repeated with the exception of using an equal amount of the C-1 alcohols listed in Column I to afford the corresponding C-1 bromide listed in Column II.

I 3,7-dimethylocta-2,6-dien-1-ol,
3-methyl-7-ethylnona-2,6-dien-1-ol,
3,7-dimethylnona-2,6-dien-1-ol,
4-methyl-8-ethyldeca-3,7-dien-1-ol,
4,8-dimethyldeca-3,7-dien-1-ol,
4,8-dimethylnona-3,7-dien-1-ol,
1,5-dimethylhex-4-en-1-ol,
3,7-dimethyloct-6-en-1-ol,

II 1-bromo-3,7-dimethylocta-2,6-diene,
1-bromo-3-methyl-7-ethylnona-2,6-diene,
1-bromo-3,7-dimethylnona-2,6-diene,
1-bromo-4-methyl-8-ethyldeca-3,7-diene,
1-bromo-4,8-dimethyldeca-3,7-diene,
1-bromo-4,8-dimethylnona-3,7-diene,
1-bromo-1,5-dimethylhex-4-ene,
1-bromo-3,7-dimethyloct-6-ene The C-1 chlorides are prepared in the same way using phosphorus trichloride in place of phosphorus tribromide.

D. By repeating the process of Part B using the bromides listed in Column II as the starting material, the corresponding esters listed in Column III are obtained.

III methyl 4-(3',7'-dimethylocta-2',6'-dienyloxy)-benzoate,
methyl 4-(3'-methyl-7'-ethylnona-2',6'-dienyloxy)-benzoate,
methyl 4-(3', 7'-dimethylnona-2',6'-dienyloxyl)-benzoate,
methyl 4-(4'-methyl-8'-ethyldeca-3',7'-dienyloxy)-benzoate,
methyl 4-(4',8'-dimethyldeca-3', 7'-dienyloxy)-benzoate,
methyl 4-(4',8'-dimethylnona-3',7'-dienyloxy)-benzoate,
methyl 4-(1',5'-dimethylhex-4'-enyloxy)-benzoate, and
methyl 4-(3',7'-dimethyloct-6'-enyloxy)-benzoate.

EXAMPLE 2

A. To a solution of 2 g. of methyl 4-(3',7'-dimethylocta-2',6'dienyloxy)benzoate in 20 ml. of ethanol, cooled to 0° by an ice bath, is added a suspension of 2.32 g. of mercuric acetate in 50 ml. of ethanol over 15 minutes. The reaction mixture is stirred for 2 hours and then, with cooling, 1.22 g. of potassium hydroxide in 20 ml. of ethanol is added. Then 0.139 g. of sodium borohydride is added in small portions and stirring continued 30 minutes. The solution is decanted, then concentrated to half volume, diluted with 100 ml. of water and extracted with ether (3 × 50). The ethereal phase is washed with water, dried over magnesium sulfate, and the crude product chromatographed on silica using hexane:ether to yield methyl 4-(3',7'-ethoxyoct-2'-enyloxy)benzoate.

B. The foregoing process of Part A is repeated with the exception of replacing methyl 4-(3',7'-dimethyloc-ta-2',6'-dienyloxy)benzoate with an equal amount of each of:
methyl 4-(3',7'-diethylnona-2',6'-dienyloxy)-benzoate,
methyl 4-(3'-methyl-7'-ethylnona-2',6'-dienyloxy)-benzoate,
methyl 4-(3',7'-dimethylnona-2',6'-dienyloxy)-benzoate,
methyl 4-(4'-methyl-8'-ethyldeca-3',7'-dienyloxy)-benzoate,
methyl 4-(4',8'-dimethyldeca-3',7'-dienyloxy)-benzoate,
methyl 4-(4',8'-dimethylnona-3',7'-dienyloxy)-benzoate,
methyl 4-(1',5'-dimethylhex-4'-enyloxy)-benzoate,
methyl 4-(3',7'-dimethyloct-6'-enyloxy)-benzoate to yield
methyl 4-(3',7'-diethyl-7'-ethoxynon-2'-enyloxyl-benzoate, methyl 4-(3'-methyl-7'-ethyl-7'-ethoxynon-2'-enyloxy-benzoate, methyl 4-(3',7'dimethyl-7'-ethoxynon-2'-enyloxy)-benzoate, methyl 4-(4'-methyl-8'-ethyl-8'-ethoxydec-3'-enyloxy)-benzoate, methyl 4-(4',8'-dimethyl-8'-ethoxydec-3'-enyloxy)-benzoate, methyl 4-(4',8'-dimethyl-8'-ethoxynon-3'-enyloxy)-benzoate.

methyl 4-(1',5'-dimethyl-5'-ethoxyhexanyloxy)-benzoate, and methyl 4-(3',7'-dimethyl-7'-ethoxyoctanyloxy)-benzoate.

By use of each of methanol, n-propanol, i-propanol or n-butanol in the foregoing process of this example in place of ethanol, the corresponding alcohol additives are obtained. For example, the use of an equal amount of methanol, n-propanol, i-propanol or n-butanol in place of ethanol in Part A yields each of methyl 4-(3',7'-dimethyl-7'-methoxyoct-2'-enyloxy)benzoate, methyl 4-[3',7'-dimethyl-7'-(n-propoxy)oct-2'-enyloxy]benzoate, methyl 4-[3',7'-dimethyl-7'-(i-propoxy)oct2'-enyloxy]benzoate, respectively.

EXAMPLE 3

To a mixture of 1.9 g. of mercuric acetate, 6 ml. of water and 20 ml. of tetrahydrofuran is added 1.49 g. of methyl 4-3',7'-diethylnona -2',6'-dienyloxy)benzoate slowly. After addition is complete, the reaction mixture is stirred for about 20 minutes. The mixture is cooled to about 0° and 6 ml. of aqueous sodium hydroxide (3 molar) is added followed by 0.49 g. of sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica to yield methyl 4-(7'-hydroxy-3',7'-diethylnon-2'-enyloxy)benzoate.

The above process is repeated with the exception of using the esters listed in Column III as the starting material to yield the corresponding hydroxy-substituted ester, that is;

methyl 4-(b 7'-hydroxy-3',7'-dimethyloct-2'-enyloxy)-benzoate, methyl 4-(7'-hydroxy-3'-methyl-7'-ethylnon-2'-enyloxy)-benzoate, methyl 4-(7'-hydroxy-3',7'-dimethylnon-2'-enyloxy)-benzoate, methyl 4-(8'-hydroxy-4'-methyl-8'-ethyldec-3'-enyloxy)benzoate, ethyl 4-(8'hydroxy-4',8'-dimethyldec-3'-enyloxy)-benzoate, methyl 4-(8'-hydroxy-4',8'-dimethylnon-3'-enyloxy)-benzoate, methyl 4-(5'-hydroxy-1',5'-dimethylhexanyloxy)-benzoate, and methyl 4-(7'-hydroxy-3',7'-dimethyloctanyloxy)benzoate.

EXAMPLE 4

To a solution of 2 g. of sodium in 50 ml. of methanol at about 0° is added 35 g. of methyl p-thiobenzoate. After about 0.5 hour, 15 g. of 1-bromo-3,7-dimethylocta-2,6-diene is added and then the mixture is refluxed for about 2 hours. Then the solvent is evaporated and the concentrate taken up in petroleum ether which is washed with water, dried over magnesium sulfate and evaporated under reduced pressure to yield methyl 4-(3',7'-dimethylocta-2',6'-dienyl)thiobenzoate which can be purified by chromatography.

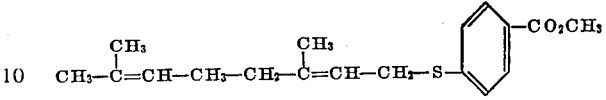

By using the other bromides listed in Column II as the starting material, the corresponding thioethers are prepared.

An alternative process for the preparation of the thioethers is to prepare the thiol of the C-1 bromides listed in Column II as follows:

To a solution of 2 g. of sodium hydroxide in 40 ml. of methanol saturated with hydrogen sulfide is added 14 g. of 1-bromo-3,7-dimethylocta-2,6-diene. The mixture is stirred at about 25° for about 5 hours with continued introduction of hydrogen sulfide. The mixture is diluted with water and then extracted with petroleum ether. the organic phase is washed well with water, dried over sodium sulfate and evaporated under reduced pressure to yield 3,7-dimethyloct-2,6-dienylmercaptan which is purified by chromatography.

The thus-obtained thiol is then reacted with methyl p-bromobenzoate in the presence of base, such as alcoholic sodium methoxide.

EXAMPLE 5

To a solution of 2 g. of methyl 4-(3',7'-dimethylocta-2',6'-dienyl) thiobenzoate in 20 ml. of ethanol, cooled to 0°, is added a suspension of 2.3 g. of mercuric acetate in 50 ml. of ethanol over 15 minutes. The reaction mixture is stirred for 2 hours and then, with cooling, 1.2 g. of potassium hydroxide in 20 ml. of ethanol is added. Then 0.14 g. of sodium borohydride is added in small portions and stirring continued for about 30 minutes. The solution is then decanted, concentrated to half volume, diluted with 100 ml. of water and extracted with ether. The ethereal phase is washed with water, dried over magnesium sulfate and evaporated under reduced pressure to yield methyl 4-(7'-ethoxy-3',7'-dimethyloct-2'-enyl)thiobenzoate which is purified by chromatography.

The foregoing process is used for the addition of alcohol to the other thioethers prepared as described in Example 4 to obtain the corresponding alkoxy thioethers. Similarly, the addition of water to the thioethers is accomplished using the process of Example 3 to prepare the hydroxy-substituted thioethers of the present invention.

EXAMPLE 6

To 210 ml. of a 0.5M solution of sodium metaperiodate (aqueous methanol 1:1) at 0° is added 0.1 mole of methyl 41(7'-ethoxy-3',7'-dimethyloct-2'-enyl)thiobenzoate. The mixture is stirred at 0° for 4 hours and then filtered to remove precipitated sodium iodate. The filtrate is diluted with water and then extracted with chloroform. The extract is dried over magnesium sulfate and solvent removed by evaporation under reduced pressure to yield the corresponding sulfoxide.

Other sulfoxides of the present invention are prepared using the foregoing process.

EXAMPLE 7

To 200 ml. of aqueous methanol (1:1) containing 0.2 moles of sodium metaperiodate is added 0.1 mole of methyl 4-(7'-ethoxy-3',7'-dimethyloct-2'enyl)thiobenzoate. The mixture is maintained at about 30° for 6 hours. After cooling, the mixture is filtered to remove precipitated sodium iodate. The filtrate is diluted with water and then extracted with chloroform. The extract is dried over magnesium sulfate and solvent removed by evaporation to yield the corresponding sulfone which can be purified by chromatography on silica.

Using the above process, the other sulfones of the present invention are prepared.

EXAMPLE 8

A. A suspension of sodium hydride in mineral oil (0.5 g., 50 percent) is mixed with 15 ml. of dioxane under nitrogen and then 1.7 g. of methyl p-aminobenzoate in 10 ml. of dioxane is added. The mixture is refluxed and then 2.4 g. of 1-bromo-3,7dimethylocta-2,6diene in 15 ml. of dioxane is added and the mixture refluxed for about 2 hours. The reaction mixture is cooled, filtered and filtrate concentrated. The concentrate is taken up in ether, washed with water and dilute aqueous HCl, dried over magnesium sulfate and evaporated to yield methyl N-3,7-dimethylocta-2,6dienyl-p-aminobenzoate which is purified by chromatography on silica.

The above process is useful for preparing the corresponding amines from the bromides listed in Column II. Thus, for example, 1-bromo-3,7-dimethyloct-6-enen is converted into methyl N-3,7-dimethyloct -6-enyl-p-aminobenzoate and 1-bromo-1,5-dimethylhex-4-ene into methyl N-1,5-dimethylhex-4-enyl-p-aminobenzoate.

By using a larger quantity of the C-l bromide reagent in the above process, the formation of tertiary amine (III' and IV' in which P is two) is favored. Thus, in the above process, use of 4.8 g. of 1-bromo-3,7-dimethylocta-2,6-diene gives almost exclusively methyl N,N-3,7-dimethylocta-2,6-dienyl-p-aminobenzoate.

B. To a solution of 2 g. of methyl N-3,7-dimethylocta-2,6-dienyl-p-aminobenzoate in 20 ml. of ethanol, cooled to about 0°, is added a suspension of 2.3 g. of mercuric acetate in 50 ml. of ethanol over about 15 minutes. The reaction mixture is stirred for about 2 hours and then, with cooling 1.2 g. of ethanol is added. Then, 0.14 g. of sodium borohydride is added in small portions and stirring continued about 30 minutues. The solution is decanted, concentrated to half volume, diluted with water and then extracted with ether. The ethereal phase is washed with water and dried over magnesium sulfate to yield methyl N-7-ethoxy-3,7-dimethyloct-2-enyl-p-aminobenzoate which is purified by chromatography.

By use of the above method, other compounds of the present invention of formula III are prepared from the appropriate precursor prepared as described in Part A. Thus, each of methyl N-3,7-dimethyloct-6-enyl-p-aminobenzoate and methyl N-1,5-dimethylhex-4-enyl-p-aminobenzoate is converted into methyl N-7-ethoxy-3,7-dimethyloctanyl-p-aminobenzoate and methyl N-5-ethoxy-1,5-dimethylhexanyl-p-aminobenzoate, respectively. Similarly, other alkoxy derivatives are prepared by using other alcohols in place of ethanol. The hydroxyl derivatives are prepared using the process of Example 3 with the exception of using an amine of formulas III' and IV' as the starting material. By using double the amount of mercuric salt alcohol in the above process, the substituted tertiary amines are prepared.

EXAMPLE 9

A. To a mixture of 5 ml. of acetonitrile and 0.94 mmol. of methyl 4-(3',7'-dimethylocta-2',6'-dienyloxy)benzoate, cooled to 0°, is added with stirring 0.94 mmol. of mercuric nitrate in portions. After starting material has disappeared (about 2 hours), there is added 66.5 µl. of 3M sodium hydroxide (aqueous) and 213 µl. of 0.5M sodium borohydride in 3M sodium hydroxide (aqueous). After several minutes at 0°, the mixture is saturated with sodium chloride and then extracted with ether. The ethereal phase is washed, dried and then evaporated to yield the acetamide derivative:

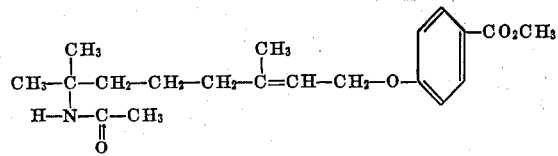

which is purified by chromatography.

Following the above process, the other ethers listed in Column III are converted into the corresponding acetamido substituted compounds with the acetamido groups being attached to the C-7, C-7, C-8, C-8, C-8, C-5 and C-7 position of the side chain respectively.

B. Ten mmol. of the 7-acetamido compound of Part A is dissolved in 10 ml. of 3M sodium hydroxide:ethanol under nitrogen. The reaction mixture is stirred for 48 hours at room temperature and the crude product isolated by extraction with ether and then chromatographed to yield 4-(7'-amino-3',7'-dimethyloct-2'-enyloxy)benzoic acid.

By use of the foregoing process, there is prepared:
4-(7'-amino-3'-methyl-7'-ethylnon-2'-enyloxy)-benzoic acid,
4-(7'-amino-3',7'dimethylnon-2'-enyloxy)benzoic acid,
4-(8'-amino-4'-methyl-8'-ethyldec-3'-enyloxy)-benzoic acid,
4-(8'-amino-4',8'-dimethyldec-3'-enyloxy)benzoic acid  4-(8'-amino-4',8'-dimethylnon-3'-enyloxy)benzoic acid,
4-(5'-amino-1',5'-dimethylhexanyloxy)benzoic acid, 4-(7'-amino-3',7'-dimethyloctanyloxy)benzoic acid from the corresponding acetamido compounds prepared as described in Part A.

C. A mixture of 10 mmol. of methyl 4-(7'-amino-3',7'-dimethyloct-2'-enyloxy)benzoate, 10 ml. of ether and two equivalents of ethyl iodide is refluxed until starting material substantially disappears. The crude product is purified by distillation to yield methyl 4-(7'-N,N-diethylamino-3',7'-dimethyloct-2'-enyloxy)-benzoate.

By using methyl iodide or other lower alkyl iodide in the foregoing process, the corresponding N,N-di(lower alkyl)amino substituted compounds are obtained, e.g. methyl 4-(7'-N,N-dimethylamino-3',7'-dimethyloct-2'-enyloxy)benzoate is obtained by using two equivalents of methyl iodide.

By repeating the foregoing process with the exception of using one equivalent of lower alkyl iodide, the mono-substituted amino products are obtained. For example, the use of one equivalent of methyl iodide or ethyl iodide affords methyl 4-(7'-N-methylamino-3',7'-dimethyloct-2'-enyloxy)benzoate and methyl 4-(7'-N-ethylamino-3',7'-dimethyloct-2'-enyloxy)benzoate.

Mixed di-substituted amino compounds are prepared by reacting a mono-substituted amino compound, e.g. methyl 4-(7'-N-methylamino-3',7'-dimethyloct-2'-enyloxy)benzoate with one equivalent of a lower alkyl iodide, such as ethyl iodide or propyl iodide to yield, e.g. methyl 4-(7'-N-methyl-N-ethyl-3',7'-dimethyloct-2'-enyloxy)benzoate using the process above.

EXAMPLE 10

The process of Example 2, Part A, is repeated using benzyl alcohol in place of ethanol to yield methyl 4-(3',7'-dimethyl-7'-benzyloxyoct-2'-enyloxy)-benzoate.

EXAMPLE 11

A. To a solution of 20.9 g. of the ethylene ketal of 1-bromo-4-pentanone (obtained by treating 1-bromo-4-pentanone with ethylene glycol in benzene in the presence of p-toluenesulfonic acid) in 100 ml. of benzene is added 20 g. of triphenylphosphine. The mixture is heated at reflux temperature for 2 hours and then filtered. The solid material thus-collected is washed with benzene, dried in vacuo and added to 6.49 g. of butyl lithium in 50 ml. of dimethylsulfoxide. The mixture is stirred until an orange solution is obtained and 38 g. of methyl ethyl ketone is then added. The mixture is stirred at about 25° for about 8 hours, poured into water and then extracted with ether. The ethereal phase is concentrated and the concentrate added to 0.1N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one (VIII; $R^2 = R^3 =$ methyl, $R^4 =$ ethyl) which is purified by chromatography and separated into the cis and trans isomer.

By repeating the above process using the ethylene ketal of each of 1-bromo-5-hexanone and 1-bromo-4-hexanone, there is obtained 7-methyl-6-nonen-2-one and 7-methyl-6-nonen-3-one.

B. A mixture of 11.2 g. of diethyl carbomethoxymethylphosphonate in 100 ml. of dimethylformamide is treated with 2.4 g. of sodium hydride. The mixture is stirred until the evolution of gas ceases and then 10 g. of 7-methyl-6-nonen-2-one is added slowly with stirring, maintaining temperature below 30°. The mixture is stirred for about 1 hour, then diluted with water and then extracted with ether. The ethereal phase is washed with water, dried over sodium sulfate and evaporated under reduced pressure to yield methyl 3,8-dimethyldeca-2,7-dienoate as a mixture of isomers (trans,cis; trans,trans; cis,cis; and cis,trans) which are separated by chromatography.

C. Six grams of 6-methyl-5-octen-2-one is added to a solution of 3.0 g. of sodium borohydride, 80 ml. of methanol and 6 ml. of 2N sodium hydroxide solution. After about 2 hours, acetic acid is added to destroy excess sodium borohydride and the solution poured into water and extracted with ether. The combined ether extracts are washed with aqueous sodium bicarbonate, water and brine, dried and evaporated to yield 6-methyl-5-octen-2-ol which is purified by chromatography.

Similarly, 7-methyl-6-nonen-2-one and 7-methyl-6-nonen-3-one is reduced to 7-methyl-6-nonen-2-ol and 7-methyl-6-nonen-3-ol.

Triphenylphosphite benzoylchloride (10 g.) is mixed with 1.9 g. of 6-methyl-5-octen-2-ol and kept at room temperature overnight. The crude product is washed with 2N sodium hydroxide and water an dried to yield 2-chloro-6-methyl-5-octene.

Alternatively, the method of Example 1 is used to prepare the bromide and chloride.

D. A solution of 2 g. of methyl-3,8-dimethyldeca-2,7-dienoate in 20 ml. of dry ether is added with stirring to 0.4 g. of lithium aluminum hydride covered in ether at 0°. After about 1 hour, 2.5 ml. of acetic acid is added. The mixture is washed with ice water and the ether phase dried and evaporated to yield 3,8-dimethyldeca-2,7-dien-1-ol which is treated with phosphorus tribomide to yield 1-bromo-3,8-dimethyldeca-2,7-diene.

E. 6-Methyl-5-hepten-2-one is converted into 4,8-dimethylnona-3,7-dienoic acid by reaction with $\beta$-carboxyethyltriphenylphosphonium chloride in diemthylsulfoxide using the method of H. S. Corey, et al., J. Am. Chem. Soc. 86, 1884 (1964). The trans and cis isomer can be separated by chromatography at this point or a mixture of the two isomers of the two isomers employed in further reactions. The acid is then converted into the acid chloride using thionyl chloride at room temperature or slightly higher temperature. The acid chloride is then treated with an alcohol, such as methanol or ethanol, at a room temperature of about 40° for a few minutes to yield the ester, e.g., methyl 4,8-dimethylnona-3,7-dienoate or ethyl 4,8-dimethylnona-3,7-dienoate.

By use of the above procedure, each of 7-methyl-6-nonen-2-one and 6-methyl-5-octen-2-one is converted into methyl 4,9-dimethylundeca-3,8-dienoate and methyl 4,8-dimethyldeca-3,7-dienoate, respectively.

Following the procedure of Part D above, each of the esters is reduced to the C-1 alcohol, i.e. 4,8-dimethylnona-3,7-dien-1-ol, 4,9-dimethylundeca-3,8-dien-1-ol and 4,8-dimethyldeca-3,7-dien-1-ol and then to the C-1 bromide, namely, 1-bromo-4,8-dimethylnona-3,7-diene, 1-bromo-4,9-dimethylundeca-3,8-diene and 1-bromo-4,8-dimethyldeca-3,7-diene, respectively.

EXAMPLE 12

To a solution of 1.7 g. of methyl 4.8-dimethylnona-3,7-dienoate in 20 ml. of ethanol, cooled to about 0°, is added a suspension of 2.3 g. of mercuric acetate in 50 ml. of ethanol, over about 15 minutes. The reaction mixture is stirred for 2 hours and then, with cooling, 1.2 g. of potassium hydroxide in 20 ml. of ethanol is added. Then 0.26 g. of sodium borohydride is added in small portions and stirring continued 30 minutes. The solution is decanted, concentrated to half volume, diluted with water and extracted with ether. The ethereal phase is washed with water, dried over magnesium sulfate and the product chromatographed to yield 8-ethoxy-4,8-dimethylnon-3-en-1-ol and methyl 8-ethoxy-4,8-dimetnylnon-3-enoate.

The methyl ester, methyl 8-ethoxy-4,8-dimethylnon-3-enoate is reduced using lithium aluminum hydride following the procedure of Example 11, Part D, to the alcohol, 8-ethoxy-4,8-dimethylnon-3-en-1-ol.

Using the foregoing procedure, each of methyl 4,9-dimethylundeca-3,8-dienoate and methyl 4,8-dimethyldeca-3,7-dienoate is converted into 9-ethoxy-4,9-dimethylundec-3-en-1-ol and 8-ethoxy-4,8-dimethyldec-3-en-1-ol. Following the procedure of, for example, Example 1 (A and then B), the C-1 alcohols thus-obtained are converted into the C-1 bromide.

A suspension of 0.5 g. of 5 percent palladium-on-carbon catalyst in 50 ml. of benzene is hydrogenated for 30 minutes. A mixture of 1.5 g. of 9-ethoxy-4,9-dimethylundec-3-en-1-ol in 75 ml. of methanol is added and hydrogenated with agitation until the theoretical amount of hydrogen is absorbed. The catalyst is removed by filtration and the solution evaporated to yield 9-ethoxy-4,9-dimethylundecan-1-ol which is purified by chromatography. The product is treated with phosphorus tribromide to yield 1-bromo-9-ethoxy-4,9-dimethylundecane which can be used as the alkylating agent for preparation of compounds of the present invention of formulas I and III.

The foregoing hydrogenation procedure can be used for preparing the saturated derivatives of the present invention (i.e. when usch of Z and Z' is hydrogen) by hydrogenation of the final product or intermediates therefor.

EXAMPLE 13

To a mixture of 1 g. of sodium and 30 ml. of methanol at room temperature is added 5 g. of methyl p-hydroxyphenyl ketone and then 6.5 g. of 1-bromo-3,7-dimethyl-7-ethoxyoct-2-ene. The mixture is then refluxed for 8 hours. After cooling, the mixture is diluted with water and then extracted with ether. The etheral extracts are combined, washed, dried over magnesium sulfate and evaporated under reduced pressure to yield methyl 4-(3',7'-dimethyl-7'-ethoxyoct-2'-enyloxy)phenyl ketone which is purified by chromatography.

By use of 1-bromo-3,7-dimethyl-7-ethoxyoctane and 1-bromo-1,5-dimethyl-5-ethoxyhexane in the foregoing procedure, there is obtained methyl 4-(3',7'-dimethyl-7'-ethoxyoctanyloxy)-phenyl ketone and methyl 4-(1',5'-dimethyl-5'-ethoxyhexanyloxy)-phenyl ketone.

Similarly, using ethyl p-hydroxyphenyl ketone as the starting material yields ethyl 4-(3',7'-dimethyl-7'-ethoxyoct-2'-enyloxy)phenyl ketone.

EXAMPLE 14

A mixture of 1 g. of methyl 4-(7'-ethoxy-3',7'-dimethyloct-2'-enyloxy)benzoate, 60 ml. of methanol, 0.2 g. of sodium carbonate and 6 ml. of water is stirred at about 30° for about 3 hours. The mixture is diluted with water, neutralized and then extracted with ether. The organic phase is washed with water, dried over sodium sulfate and evaporated at room temperature to yield 4-(7'-ethoxy-3',7'-dimethyloct-2'-enyloxy)benzoic acid which is purified by chromatography.

By use of the foregoing procedure, the other esters of the present invention can be hydrolyzed to the free acid.

EXAMPLE 15

One gram of thionyl chloride is added with stirring at room temperature to 0.5 g. of 4-(7'-ethoxy-3',7'-dimethyloct-2'-enyloxy)benzoic acid and the mixture heated at about 50° for 10 minutes. Excess thionyl chloride is removed by evaporation. To the acid chloride is added t-butyl alcohol (about 2 equivalents) and the mixture heated at absut 50° for 5 minutes. Excess t-butyl alochol is removed by evaporation to yield t-butyl 4-(7'-ethoxy-3',7'-dimethyloct-2'-enyloxy-benzoate.

By replacing t-butyl alcohol with other alcohols, such as ethanol, isopropanol, cyclohexyl alcohol or benzyl alcohol, the corresponding esters are obtained.

EXAMPLE 16

To a stirred solution of 2.5 g. of 4-(7'-ethoxy-3',7'-dimethyloct-2'-enyloxy)benzoic acid in 30 ml. of dry ether is added slowly, at 0°, 21 ml. of a one molar solution of methyl lithium in ether. After 3 hours at 20°, the mixture is poured into iced dilute aqueous HCl with stirring and then separated. The organic phase is combined with ethereal washings of the aqueous phase, washed with water, saturated potassium bicarbonate and then brine, dried over magnesium sulfate and concentrated under reduced pressure to yield methyl 4-(7'-ethoxy-3',7'dimethyloct-2'-enyloxy)phenyl ketone which is purified by chromatography and distillation.

The foregoing process is repeated using an equal amount of each of ethyl lithium, benzyl lithium, cyclopentyl lithium and n-propyl lithium to yield ethyl 4-(7'-ethoxy-3',7'-dimethyloct-2'-enyloxy)phenyl ketone, benzyl 4-ethoxy-3',7'-dimethyloct-2'-enyloxy) phenyl ketone, cyclopentyl 4-(7'-ethoxy-3',7'-dimethyloct-2'-enyloxy) phenyl ketone and n-propyl 4-(7'-ethoxy-3',7'-dimethyloct-2'-enyloxy)phenyl ketone.

Similarly, using other acids of the present invention prepared as described in Example 14 in the foregoing procedure, the corresponding ketones are obtained.

EXAMPLE 17

A solution of 2 g. of 4-(7'-amino-3',7'-dimethyloct-2'-enyloxy)benzoic acid and more equivalent of diazomethane in ether is added a drop of boron/trifluoride and the mixture allowed to stand 1 hour at 0° and then at room temperature for 2 hours. The mixture is then washed with water and organic phase evaporated to yield methyl 4-(7'-amino-3',7'-dimethyloct-2'-enyloxy) benzoate.

Similarly, using diazoethane and diazopropane, ethyl 4-(7'-amino-3',7'-dimethyloct-2'-enyloxy) benzoate and n-propyl 4-(7'-amino-3',7'-dimethyloct-2'-enyloxy)benzoate is obtained.

By use of the foregoing procedure, other acids of the present invention are converted into the corresponding esters.

What is claimed is:

1. A compound of the formula $$R^4-\overset{R^3}{\underset{R^5}{C}}-(CH_2)_n{}'-\overset{R^2}{\underset{Z}{C}}-CH-(CH_2)_m-W-R' \quad (I)$$

wherein,

R' is the group

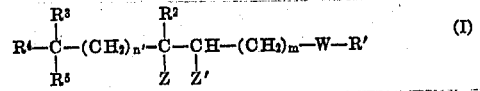

each of $R^2$, $R^3$ and $R^4$ is lower alkyl;
$R^5$ is -OR in which R is hydrogen or lower alkyl;
$R^6$ is $-OR^7$ in which $R^7$ is lower alkyl;
W is sulfur;
Z and Z' taken together form a carbon-carbon double bond;
$m$ is one or two; and
$n$ is three or four.

2. A compound according to claim 1 in which $n$ is three and each of $R^2$, $R^3$ and $R^4$ is methyl or ethyl.

3. A compound according to claim 2 in which R is lower alkyl of one to three carbon atoms.

4. The compound methyl 4-(7'-ethoxy-3',7'-dimethyloct-2'-enyl) thiobenzoate, according to claim 3.

* * * * *